March 12, 1946.   R. A. MORTENSEN   2,396,470
FLUID TESTING APPARATUS AND METHOD
Filed Jan. 22, 1943

INVENTOR
RAYMOND A. MORTENSEN
BY HARRIS, KIECH, FOSTER & HARRIS

Clarence F. Kiech
FOR THE FIRM
ATTORNEYS.

Patented Mar. 12, 1946

2,396,470

UNITED STATES PATENT OFFICE 2,396,470

FLUID-TESTING APPARATUS AND METHOD

Raymond A. Mortensen, Loma Linda, Calif., assignor to Arnold O. Beckman, Altadena, Calif.

Application January 22, 1943, Serial No. 473,267

20 Claims. (Cl. 73—33)

My invention relates to a novel method and apparatus for the determination of serum protein or for the accurate determination of densities, specific gravities, or related properties of fluids. It will be described with particular reference to a novel scientific apparatus useful in medical research to determine the protein content of blood plasma or serum, without intent to limit the invention thereto.

It is known that there is a linear relationship between the specific gravity of blood plasma and the total protein content. Several methods of determining specific gravity as indicative of protein content have previously been proposed, of which the pyknometer method is probably the most accurate though difficult to employ. Determinations of specific gravity by the falling-drop method have also been proposed but the apparatus is relatively complex and considerable experimental skill is required for its operation. The present invention eliminates any necessity for use of a stop watch or other timing device.

It is an object of the present invention to provide a novel method and apparatus for the determination of protein content of plasma or serum or for the determinations generally of specific gravities, densities, or related properties of other fluids. The invention comprehends a very simple, yet rapid and accurate, method and apparatus for such determinations.

Generally speaking, the invention comprehends the submergence of two beads in the fluid to be tested, one bead having a density slightly less than the fluid and the other having a density slightly greater than the fluid. The beads are simultaneously released from vertically-separated positions so that one moves downward and the other moves upward. The point where they come adjacent each other or come into contact is noted on an appropriate scale and will be determinative of the specific gravity, density, or related property of the fluid, in accordance with principles to be hereinafter set forth.

It is an object of the present invention to provide a novel method for determination of specific gravities, densities, or related functions by simultaneously moving through a fluid beads of such differential density that one will rise and the other will fall, the point of contact of the beads being related to the property to be measured.

The preferred apparatus includes a specially constructed pipette containing these differential-density beads and providing suitable calibrations aiding in the determination and the valuation of the point of contact. It is another object of the invention to provide such an apparatus.

It is a further object of the invention to provide for a simultaneous starting of the movement of the beads by disposing them preliminarily at fixed positions in a chamber and then quickly inverting the chamber, whereby each bead tends to move toward the position previously occupied by the other bead.

It is a further object of the invention to provide a novel apparatus for inverting such a chamber; while another object is to provide for the entrapment of air, whereby the reading is not rendered inaccurate by the presence of air bubbles in the chamber when testing fluids.

Further objects and advantages of the invention will be made evident hereinafter to those skilled in the art.

In the drawing, I have chosen to exemplify the invention as applied to an invention for determination of serum protein, for example for determination of protein content of serum. Referring thereto:

Figure 1:
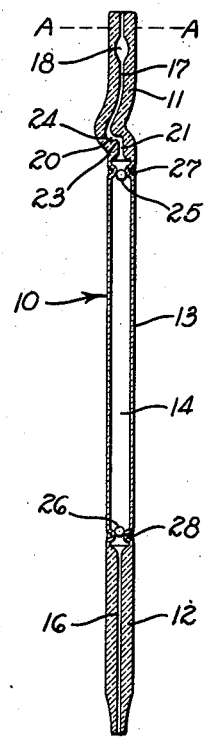
Figure 1 is a vertical sectional view of the pipette of the invention in upright position preparatory to the inversion which gives the desired reading.

Referring particularly to Figure 1, the novel pipette of the invention is indicated generally by the numeral 10 and includes a head 11 and a tip 12, between which extends a tubular body 13 providing a chamber 14. This pipette is usually formed of glass and only ordinary glass-blowing skill is required for its construction.

The tip 12 provides a capillary passage 16 communicating with the adjacent end of the chamber 14. The head 11 also provides a capillary passage 17, preferably formed with an enlargement 18 and very desirably formed to provide an air trap 20 which is in communication with the other end of the chamber 14 through a passage 21, which is usually slightly larger in diameter than the capillary passage 17. This air trap 20 is formed by bending the head 11, as best shown in Figure 1, and by providing a lip 23 extending slightly above the lowermost wall of the chamber 24 to form the air trap 20.

The dimensional relationships of the pipette are not generally critical. A capacity of 1 or 2 c. c. is usually satisfactory in the determination of serum protein or specific gravity. In this event, the chamber 14 may have an internal diameter of 4 mm. and a length of about 80 mm. in the case of a 1 c. c. pipette or about 5 mm. and 100 mm., respectively, for a 2 c. c. pipette. The capillary passages 16 and 17 may have a diameter of approximately 1 mm. and the small passage 21 communicating between the air trap 20 and the chamber 14 is usually about 2 mm. to permit free passage of air bubbles into the trap when the apparatus is in the upright position shown in Figure 1. In other equipment, these dimensions can, of course, be very substantially changed but have been found adequate for laboratory and clinical determinations.

The chamber 14 is filled with serum or other liquid to be tested in a manner to be hereinafter described, thus forming a fluid column in the tubular body 13.

Positioned and retained in the chamber 14 are first and second beads 25 and 26, the term "beads" being herein used with reference to any suitable, substantially-spherical bodies, whether solid or hollow. The first bead 25 is constructed to have a density slightly less than that of the serum in the chamber 14 and thus tends to rise therein. The second bead 26 has a density which is sightly greater than that of the serum undergoing test and thus tends to drop therein.

Suitable first and second stop means 27 and 28 are provided adjacent the ends of the chamber 14 and against which the beads rest when the pipette is in upright position and against which they are retained until the pipette is inverted. Within the spirit of the present invention, such stop means may be constructed in various ways. An extremely simple construction is shown in Figure 1, in which each of the stop means 27 and 28 is formed by indenting the glass walls of the tubular body 13 to form protrusions extending into the chamber 14 in the zone where the corresponding bead is to be retained from further movement. Preferably, each stop means provides a plurality of such protrusions spaced peripherally so as to provide a seat on which the corresponding bead is brought to rest substantially centrally with respect to the tubular body 13. Two, three, or four of such protrusions are usually preferred. The indentations and protrusions can be formed by heating the tubular body 13 and pressing the wall thereof inward with a thin brass tool, care being exercised as to reduce the area of contact with the bead to a minimum and to provide spaces between the protrusions for the passage of fluid.

The beads 25 and 26 are desirably of substantially equal size. Each should have a diameter in the neighborhood of one-half the internal diameter of the tubular body 13 to insure contact of the beads during their execursions following inversion of the pipette. In some instances, the bead diameter can be somewhat greater than one-half the internal diameter of the tubular body, in which case the beads will not move past each other after contact, though usually I prefer to make these beads slightly smaller than one-half the internal diameter of the tubular body in which they are enclosed, whereby they may continue their respective excursions following contact.

The beads are preferably of hollow glass construction and can be conveniently blown from thin-walled capillary, Pyrex tubing. The desired density is obtained by collecting a small lump of glass on one end of the bead and grinding this off a little at a time until the bead neither sinks nor rises rapidly when placed in a solution of predetermined specific gravity. It is then returned to the flame for fusion of the remaining portion of the lump into the main body of the bead. When made in this way, the bead will, in general, have a thick wall at one end but this is not detrimental to its usefulness. Final adjustment of density, if necessary, is made by grinding the thick end and then fire-polishing this in a small flame at a relatively low temperature. A number of beads prepared in this way and grouped according to density will, in commercial production, permit selection of two beads of the desired differential density and having a size as nearly equal as possible.

These beads may be suitably colored to aid in the observation thereof during excursion and at the instant of contact. The point of such contact is noted with reference to a scale 39, shown in Figure 2 as being calibrated in terms of second and third decimal places in a specific gravity scale. In the illustrated embodiment, one end of the scale represents a specific gravity of 1.016, while the other end represents a specific gravity of 1.036. In practice, I prefer to construct the beads 25 and 26, respectively, so that they have a density substantially corresponding to the extreme values of the scale and so that there is only a very minor pressure holding the beads against their respective stop means when the pipette is in its upright position shown in Figure 1.

The pipette is preferably used as follows. A suction tube, provided with a check valve if desired, is slipped over the head 11 and the tip 12 is lowered in a body of the serum to be tested. Reduction in pressure in the suction tube causes the serum to rise through the capillary passage 16 to fill the chamber 14 and extend upward in the capillary passage 17 to a level above the air trap 20, for example to a level A—A, such as to leave a small amount of air in the uppermost portion of this capillary passage. The suction can be utilized to retain the fluid in the pipette while closing the lowermost end of the tip 12 against escape of the serum by any suitable means. The suction tube is then removed and a sealing closure of the uppermost end of the capillary passage 17 is effected. For example, closure of both passages can very easily be effected by stretching a rubber band around the pipette, the lowermost end sealing the capillary passage 16 and the uppermost end sealing the capillary passage 17. The small amount of air left in the uppermost end of the capillary passage 17 permits expansion of the fluid, and it is usually preferable not to fill the pipette completely.

Figure 4:
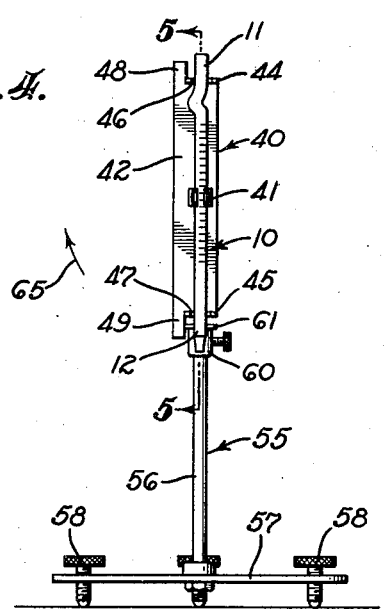
Figure 4 is a front view of the preferred apparatus used for inverting the pipette.
Figure 5:
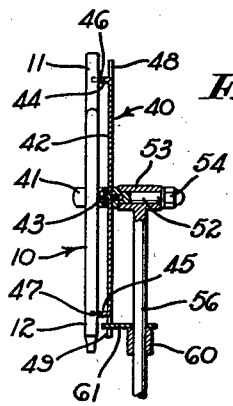
Figure 5 is a vertical sectional view, taken on the line 5—5 of Figure 4.

This operation, when the pipette is in the upright position shown in Figure 1, will cause the first bead 25 to rise into engagement with the first or upper stop means 27 and the second bead 26 to drop into engagement with the second or lower stop means 28. The entire pipette is then quickly inverted by rotating it through 180° into the position shown in Figure 2. The rate of rotation should preferably be such that the beads 25 and 26 will be retained in contact with their respective stop means 27 and 28 during the inversion. In this connection, the viscosity of the fluid being tested tends to prevent the beads leaving their respective stop means during the quick inversion, as does also centrifugal force acting on the bead 26. The proper inverting operation is not particularly difficult and can be learned by a few trials. If desired, the inversion can be made manually, with the ends of the pipette sealed, as disclosed, or it can often be made even while the suction tube is attached to the head 11. For most exacting results, the inversion is effected by use of the apparatus shown in Figures 4 and 5, to be later described.

Figure 2:
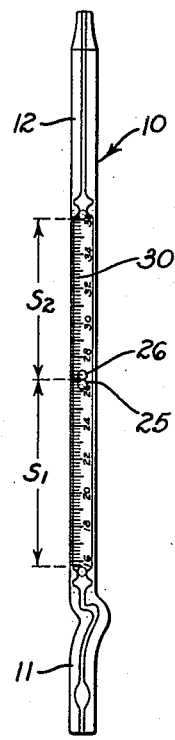
Figure 2 is an elevational view of the pipette of Figure 1, shown in inverted position at the instant the beads come into contact.

As soon as the pipette assumes its inverted position, shown in Figure 2, the beads 25 and 26, now inverted from the position shown in Figure 1, simultaneously and immediately are released from and leave their respective stop means. The bead 26, being of greater density than the serum, drops through the serum from its now-uppermost position, and the bead 25 similarly rises in the serum. The beads come into contact with each other in the chamber 14 at a position, or in a horizontal plane, which is spaced from the stop means 27 and 28, or either of them, by a distance which is a function of the density, specific gravity, or related property (e. g., protein content) of the serum. Serums of different specific gravity will cause contact of the beads at different elevations along the inverted pipette. Correspondingly, the invention comprehends any means for indicating or determining the point of contact of these beads as this is determinative of the density or related property of the serum. The preferred embodiment of the invention provides a suitably calibrated scale element 30, which may include indicia inscribed on a transparent medium subsequently made to adhere to the tubular body 13, though preferably the graduations are inscribed directly upon or in the external wall of the tubular body. In Figure 2, the point of contact of the beads 25 and 26 is indicative of a specific gravity of 1.0267. The point of contact of the beads 25 and 26 is very easily discerned, and the reading can be taken with accuracy even before any tendency for these beads to be displaced sidewise with respect to each other and, if the beads are less than half the diameter of the chamber 14, to move past each other toward the stop means.

As soon as the pipette is inverted, the air entrapped in the now-lowermost end of the capillary passage 17 tends to rise therein through the serum in this capillary passage. However, rise of air bubbles into the chamber 14 will be prevented by the air trap 20. Correspondingly, there is no error due to the presence of air bubbles in the serum. If it is observed that there are any small air bubbles adhering to the glass beads preparatory to inversion, these can be shaken off. Such small air bubbles are readily seen in good light and difficulty from this source rarely occurs with serum tested soon after centrifuging.

The scientific explanation of the device is based upon an application of Stokes' law. It is known that, when a small sphere falls under the action of gravity through a viscous fluid, the resistance to movement increases with increasing rate of fall until it is equal and opposite to the effect of gravity. Thereafter, the small sphere has a constant velocity as there is no resultant force acting upon it. According to Stokes' law, this velocity is given by the equation:

$$v = \frac{2g\alpha^2(d-D)}{9\eta} \quad (1)$$

where $d$ is the density of the sphere, $D$ the density of the fluid $\eta$ the coefficient of viscosity of the fluid, and $\alpha$ the radius of the sphere. This equation applies strictly only with reference to a spherical body falling through a fluid of infinite extension. The velocity of a small sphere falling axially through a viscous fluid in a cylindrical tube is expressed substantially by the following formula:

$$v = \frac{K(d-D)}{\eta} \quad (2)$$

where k is a numerical constant for a particular tube. Replacing the velocity by its equivalent $S/t$ (where S represents the distance traveled in the time $t$) and applying the resulting formula to the motion of each bead in turn, two equations are obtained which may be combined to give the equation:

$$\frac{S_1}{S_2} = K' \frac{D-d_1}{d_2-D} \quad (3)$$

where $S_1$ and $S_2$ are the distances traveled at constant velocity before collision of the light and heavy beads 25 and 26, respectively, and $d_1$ and $d_2$ are their densities. The distances $S_1$ and $S_2$ are shown in Figure 2. The value of $K'$ is constant for a given apparatus, and is equal to unity when the two beads have the same effective radius. Since both beads start their respective excursions simultaneously, are accelerated at the start in the same manner, and reach their limiting velocities within a comparatively short distance, $S_1$ and $S_2$ may be taken to represent the entire distances traversed without introducing significant error.

Figure 3:
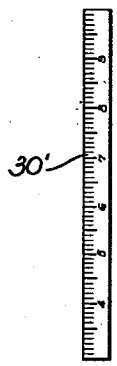
Figure 3 is a view illustrating a modified calibration by which percentages of serum protein can be read directly.

Formula 3 is sufficiently accurate to be used for purpose of calibration of the pipette. In this instance, if the densities of the beads are known, the pipette may be calibrated by making a single test on serum or salt solution of known specific gravity and noting the collision point. With values of $d_1$ and $d_2$ known and with values for $S_1$ and $S_2$ observed, the constant $K'$ in Equation 3 may be computed. Having evaluated $K'$, it is possible to calculate the distances $S_1$ and $S_2$ for any specific gravity lying within the range of the beads employed, and to plot a curve and calibrate the scale 30 accordingly. Alternatively, tests may be made on a plurality of standard solutions, observing the collision point in each instance and using it as a point on the scale 30, intervening points being filled in by interpolation. Of course, the scale can be constructed to read directly in terms of specific gravity as in Figure 2. Calibration in terms of percentage of protein, made with the aid of known formulae, will produce a scale 30' of the type shown in Figure 3 which reads directly in percentage of serum protein.

The determination should, of course, be made at the temperature for which the pipette was calibrated or suitable corrections should be made to compensate for differences in temperature. I have found that tests made at different temperatures follow the thermal expansion of the serum, indicating that the change in density of the serum is the important factor involved. A pipette calibrated at 20° C. and used at a temperature of $t°$ will read in specific gravity at $t°/20°$ C. Between 20° C. and 30° C., the change in serum specific gravity averages about 0.00025 per degree. A reading taken within this temperature range may be reduced to specific gravity 20°/20° C. by adding 0.00025 to the observed specific gravity for each degree centigrade above 20, this correction being accurate between one unit in the fourth decimal place. For clinical purposes, an approximate correction may be applied by adding 0.1 to the percentage of protein for each degree rise in temperature.

Comparative tests as to the accuracy of the invention as compared with a pyknometer and the falling-drop method indicate that the accuracy of the pipette is surprisingly consistent with the pyknometer determination, which is at present considered the most reliable test, though difficult to perform. The average difference between results obtained by the pyknometer and the pipette of the present invention is less than 0.0002. These results show that the pipette of the invention compares very favorably in accuracy with the falling-drop technique which, again, is difficult, and in tests of some serums the specific gravities obtained by the present invention are much more consistent with the pyknometer method than are the gravities determined by the falling-drop method.

The manner of inverting the pipette does not introduce significant inaccuracies in most uses. However, for the greatest accuracy, use is preferably made of the holder shown in Figures 4 and 5. Here, the filled pipette, in upright position, is attached to a support 40 by use of a bifurcated spring clip 41, the support including a plate 42 to which the clip is attached, as by a screw 43. The upper and lower ends of the plate 42 are slotted to provide ears 44 and 45 which are bent forward and cut to provide forward-facing V-shaped notches 46 and 47, respectively receiving the head 11 and tip 12 of the pipette, these elements being held pressurally in contact with the walls of the V-shaped notches by action of the spring clip 41. This construction leaves tabs 48 and 49 extending from the main portion of the plate 42 to form a part of the stop means to be later described.

The support 40 is pivoted so that the pipette may be turned about the horizontal axis to which reference has previously been made. This pivoting is effected by use of a shouldered pin 52 attached to the plate 42 by the screw 43 and journalled in a tube 53, axial movement being prevented by a nut 54. This tube 53 forms a part of a base means 55, as does also a rod 56 secured to the tube 53 and to a base plate 57 provided with the usual leveling screws 58.

The stop means for preventing any rotation of the support 40 through an angle greater than 180° is shown as including a flange 60 carried by the rod 56 and having a forward-extending bar 61 disposed in the path of travel of each of the tabs 48 and 49. This stop means is so designed that, when the tab 49 is in contact with one side of the bar 61, the pipette will be in an upright position, preferably with the axis of the chamber 14 disposed vertically. When the pipette is to be inverted, as by rotation in the direction of the arrow 65 of Figure 4, the leading edge of the tab 48 engages the other side of the bar 61 to determine the inverted position of the pipette, the axis of the chamber 14 being then preferably vertically disposed. The turning of the support 40 can be by manual means and the nut 54 can be tightened to exert a small frictional drag on the support.

The invention comprehends the simultaneous releasing of the beads from positions such that they move through the fluid to be tested in a direction toward each other to move adjacent each other and, preferably, collide at a position which is determinative of the density, specific gravity, or related property of the fluid undergoing test. The provision of stop means for the beads and the turning of the pipette form a very convenient and simple way of simultaneously releasing the beads to start their respective excursions, but it is, of course, contemplated that other means can be employed or that the method of testing can be performed by manual inversion. Nor is the invention limited to the visual observation of the point of collision as various other means indicating this point can be employed.

The invention is adapted generally to the testing of any fluid, including both liquids and gases, but finds particular application in the testing of fluids of a somewhat viscous character. The respective densities of the beads 25 and 26 will, of course, be determined with reference to the range of densities, specific gravities, etc., to be measured.

Various changes and modifications can be made without departing from the spirit of the invention and are comprehended in the following claims.

I claim as my invention:

1. In combination in a device for determination of the density of a contained fluid following quick inversion in position: an invertible body having a relatively long and narrow chamber adapted to contain the fluid to be tested; and means for determining the density of said fluid following quick inversion of said body, said means including a first bead in said chamber and having a density less than that of said fluid to rise in said fluid when said invertible body is in upright position, a second bead in said chamber and having a density greater than that of said fluid to sink in said fluid when said invertible body is in said upright position, and two stop means associated with said body for respectively limiting the upward movement of said first bead and the sinking movement of said second bead to insure positioning of said beads respectively in predetermined upper and lower positions whereby quick turning of said body through 180° to an inverted position will simultaneously start excursions of said beads through said fluid toward each other, said first bead rising through said fluid from its previously-engaged stop means and said second bead sinking through said fluid from its previously-engaged stop means, said beads coming into adjacency at an intermediate section of said chamber which is separated from one of said stop means by a distance which is a measure of the density of said fluid, and means for measuring said distance to determine the density of said fluid.

2. In combination: walls defining a chamber for retaining a fluid to be tested; a first bead in said chamber and having a density less than that of said fluid thereby tending to rise in said fluid; a second bead in said chamber and having a density greater than that of said fluid thereby tending to sink in said fluid; means for retaining said beads against vertical movement at vertically-spaced positions within said chamber when in upright position, whereby said beads simultaneously move from their respective retaining means upon quick inversion of said chamber to start excursions through said fluid along paths which will bring said beads into contact; and means for determining the point of contact of said beads in said fluid as a measure of the density of said fluid.

3. A combination as defined in claim 2, in which said last-named means includes a scale element for measuring the distance between the point of contact of said beads and one of said positions.

4. In combination: walls defining an invertible fluid-filled chamber; a first bead in said chamber and having a density less than that of said fluid thereby tending to rise in said fluid to an upper position therein when said chamber is in an upright position preparatory to inversion to test said fluid; a second bead in said chamber and having a density greater than that of said fluid thereby tending to sink in said fluid to a lower position when said chamber is in said upright position whereby quick inversion of said walls reverses said positions and immediately permits said first bead to rise and said second bead to sink in said fluid until they contact each other; and means for measuring the distance travelled by a bead to the point of contact of said beads in said fluid upon such inversion as a measure of the density of said fluid.

5. In combination: walls defining an invertible chamber for retaining a fluid; a first bead in said chamber and having a density less than that of said fluid and thus tending to rise therein; a second bead in said chamber and having a density greater than that of said fluid and thus tending to sink therein; a first stop means limiting the upward movement of said first bead when said chamber is in an upright position; a second stop means limiting the downward movement of said second bead when said chamber is in said upright position, said beads respectively and simultaneously moving from the vicinity of said first and second stop means upon quick inversion of said chamber to permit said beads to move through said fluid toward each other and come into contact at a position separated from one of said stop means by a distance which is a function of the density of said fluid; and means for measuring said distance.

6. In combination: a transparent graduated tubular body providing a chamber; means for entrapping fluid to be tested in said chamber; a first bead in said chamber and having a density less than that of said fluid and thus tending to rise therein; a second bead in said chamber and having a density greater than that of said fluid and thus tending to sink therein; a first stop means limiting the upward movement of said first bead when said chamber is in an upright position; and a second stop means limiting the downward movement of said second bead when said chamber is in said upright position, said beads respectively and simultaneously moving from the vicinity of said first and second stop means upon quick inversion of said chamber to permit said beads to move through said fluid toward each other and come into contact with each other at a point opposite the graduations of said transparent tubular body, said point being measurable by observation relative to said graduations.

7. In combination: a tubular body providing a chamber; a head at one end of said tubular body and providing a capillary passage therethrough communicating with said chamber; a tip at the other end of said tubular body and providing a capillary passage therethrough, said passages forming a means for moving a fluid to be tested to and from said chamber; a first bead in said chamber and having a density less than that of said fluid and thus tending to rise therein; a second bead in said chamber and having a density greater than that of said fluid and thus tending to sink therein; a first stop means limiting the upward movement of said first bead when said tubular body is in an upright position; a second stop means limiting the downward movement of said second bead when said tubular body is in said upright position, said beads respectively and simultaneously moving from the vicinity of said first and second stop means upon quick inversion of said tubular body to permit said beads to move through said fluid toward each other and come into contact at a position separated from one of said stop means by a distance which is a function of the density of said fluid; and means for measuring said distance.

8. In combination: a tubular body providing a chamber adapted to retain a fluid; a head at the upper end of said tubular body and providing a small passage communicating with said chamber to receive a part of said fluid but being incompletely filled therewith to provide an air space; an air trap forming a part of said passage to entrap air from said air space and prevent entry of air into said chamber upon inversion of said tubular body; a first bead in said chamber and having a density less than that of said fluid and thus tending to rise therein; a second bead in said chamber and having a density greater than that of said fluid and thus tending to sink therein; a first stop means limiting the upward movement of said first bead when said tubular body is in an upright position; and a second stop means limiting the downward movement of said second bead when said tubular body is in said upright position, said beads respectively and simultaneously moving from the vicinity of said first and second stop means upon quick inversion of said tubular body to permit said beads to move through said fluid toward each other and come into contact at a position separated from one of said stop means by a distance which is a function of the density of said fluid.

9. A combination as defined in claim 8, in which said air trap comprises an enlarged chamber in said small passage and provides a lower wall and a lip extending to a position above said lower wall when said tubular body is in upright position whereby upon inversion of said tubular body air is trapped in said chamber by said lip to prevent rise of air to said body of fluid in said chamber of said tubular body.

10. In combination: a glass pipette comprising a tubular body providing a chamber for retaining a fluid to be tested and comprising a head and a tip at opposite ends of said tubular body forming a passage means for delivery of fluid to and discharge of fluid from said chamber; a first bead in said chamber and having a density less than that of said fluid and thus tending to rise therein; a second bead in said chamber and having a density greater than that of said fluid and thus tending to sink therein; a first stop means limiting the upward movement of said first bead when said pipette is in an upright position; a second stop means limiting the downward movement of said second bead when said pipette is in an upright position, said beads respectively and simultaneously moving from the vicinity of said first and second stop means upon quick inversion of said pipette to permit said beads to move through the fluid toward each other and come into contact at a position determinative of the gravity of said fluid; and a scale element associated with said tubular body for measuring said position as a function of the specific gravity or related property of the fluid.

11. A combination as defined in claim 10, in which said beads are substantially spherical and of a diameter in the neighborhood of one-half the diameter of said chamber.

12. A combination as defined in claim 10, in which each of said stop means comprises one or more indentations in the glass of said tubular body to form one or more protrusions extending into said chamber a sufficient distance to prevent passage of said beads to a position beyond said stop means while permitting passage of fluid even when the corresponding bead is in engagement with the stop means.

13. In combination: a glass pipette comprising a head providing a small-diameter passage, a tip providing a small-diameter passage and a graduated tubular body between said head and said tip, said tubular body providing a chamber for retaining a fluid to be tested, said small-diameter passages communicating with said chamber for delivery of said fluid to and discharge of said fluid from said chamber; a first bead in said chamber and having a density less than that of said fluid and thus tending to rise therein; a second bead in said chamber and having a density greater than that of said fluid and thus tending to sink therein; a first stop means limiting the upward movement of said first bead when said pipette is in an upright position, said first stop means including one or more indentations in the glass of said tubular body to form one or more protrusions extending into said chamber a sufficient distance to prevent passage of said first bead to a position beyond said stop means; and a second stop means limiting the downward movement of said second bead when said pipette is in an upright position, said second stop means including one or more indentations in the glass of said tubular body to form one or more protrusions extending into said chamber a sufficient distance to prevent passage of said second bead to a position beyond said second stop means, said first and second beads respectively and simultaneously moving from the vicinity of said first and second stop means upon quick inversion of said pipette to permit said beads to move through the fluid toward each other and come into contact at a position opposite said graduations.

14. In combination: a tubular body defining an invertible chamber for retaining a fluid; a first bead in said chamber and having a density less than that of said fluid thereby tending to rise in said fluid to an upper position therein; a second bead in said chamber and having a density greater than that of said fluid thereby tending to sink in said fluid to a lower position whereby inversion of said tubular body permits said first bead to rise and said second bead to sink in said fluid until they contact each other at a position determinative of the gravity of said fluid; a support for said tubular body; and means for pivotally mounting said support to turn about a horizontal axis and carry said tubular body from upright to inverted position.

15. In combination: a tubular body defining an invertible chamber for retaining a fluid; a first bead in said chamber and having a density less than that of said fluid thereby tending to rise in said fluid to an upper position therein; a second bead in said chamber and having a density greater than that of said fluid thereby tending to sink in said fluid to a lower position whereby inversion of said tubular body permits said first bead to rise and said second bead to sink in said fluid until they contact each other at a position determinative of the gravity of said fluid; a support for said tubular body; a base means; means for pivotally connecting said support to said base means to turn about a horizontal axis; and stop means associated with said support and said base means for limiting the pivotal movement of said support between a first position in which said tubular body is upright and a second position in which said tubular body is inverted.

16. A method for determining the density, specific gravity, or a related property of a fluid by use of first and second beads of different density, the density of the first bead being less than that of said fluid and the density of the second bead being greater than that of said fluid, which method includes the steps of: submerging said first bead in said fluid at a lower position whereby upon release of said first bead it tends to rise in said fluid; submerging said second bead in said fluid at an upper position above said lower position whereby upon release of said second bead it tends to sink in said fluid; and simultaneously releasing said beads to move vertically in opposite directions toward each other to come adjacent each other in a horizontal zone, the position of which relative to said upper and lower positions is determinative of the density, specific gravity, or related property of said fluid.

17. A method as defined in claim 16, in which said beads are simultaneously released in a vertical column of said fluid, and in which said beads come into contact with each other in said column and in said horizontal zone.

18. A method for determining the density, specific gravity, or a related property of a fluid confined as a column and by use of first and second beads respectively of lesser and greater density than said fluid and by use of first and second stop means impeding gravitational motion of said beads and being spaced from each other along said column, which method includes the steps of: submerging said first and second beads in the fluid of said fluid column whereby said first bead tends to rise in said fluid into contact with said first stop means and whereby said second bead tends to drop in said fluid into contact with said second stop means; and rapidly turning said column through substantially 180° about a substantially horizontal axis to assume an inverted position, said column being turned at such rate that the first and second beads remain substantially in engagement respectively with said first and second stop means until said column reaches its inverted position whereby said beads in such inverted position simultaneously start excursions through said fluid of said fluid column to meet at a position between the now-inverted stop means at a position therebetween determinative of the density, specific gravity, or related property of said fluid.

19. A method for determining the density or related property of a liquid by means of a first bead having a density less than that of the liquid and a second bead having a density greater than that of the liquid, which method includes the steps of: positioning the bead of lower density in a lower portion of an upright column of the liquid; positioning the bead of greater density in an upper portion of said column of liquid; simultaneously releasing said beads to permit them to move toward and into contact with each other; and measuring the amount of movement to the point of contact as a function of the density or related property of the liquid.

20. A combination according to claim 5, wherein both the first and second stop means provide means permitting free passage of fluid around the respective beads when the respective beads are in engagement with said stop means.

RAYMOND A. MORTENSEN.